United States Patent [19]

Ross et al.

[11] 4,150,375
[45] Apr. 17, 1979

[54] INTERFEROMETRIC PROTECTIVE SYSTEM FOR VEHICLES

[75] Inventors: Gerald F. Ross, Lexington; Kenneth W. Robbins, Wilmington, both of Mass.

[73] Assignee: Sperry Rand Corporation, New York, N.Y.

[21] Appl. No.: 882,677

[22] Filed: Mar. 2, 1978

[51] Int. Cl.² .............................................. G01S 9/04
[52] U.S. Cl. .................................................. 343/7 VM
[58] Field of Search ................................... 343/7 VM

[56] References Cited

U.S. PATENT DOCUMENTS

| | | | |
|---|---|---|---|
| 3,346,862 | 10/1967 | Raudsep | 343/113 R |
| 3,750,169 | 7/1973 | Strenglein | 343/7 VM |
| 3,858,205 | 12/1974 | Ross | 343/7 VM |
| 3,987,446 | 10/1976 | Lipsky et al. | 343/16 LS X |
| 4,017,854 | 4/1977 | Ross | 343/16 R |

Primary Examiner—Malcolm F. Hubler
Attorney, Agent, or Firm—Howard P. Terry

[57] ABSTRACT

A base band transmitter cooperates with dual base band receiver antennas, a single receiver channel, and a tapped delay correlator device for the prevention of vehicular collisions, the configuration effectively narrowing the normally wide base band antenna pattern to span a single predetermined forward traffic lane.

10 Claims, 6 Drawing Figures

INTERFEROMETRIC PROTECTIVE SYSTEM FOR VEHICLES

BACKGROUND OF THE INVENTION

1. Field of the Invention

The invention pertains to base band presence detection and range measurement systems and more particularly to means effectively narrowing the antenna patterns of such base band radio systems as employed in vehicular protective systems.

2. Description of the Prior Art

Systems employing sub-nanosecond base band pulses as object detectors generally exhibit beam widths too broad for good discrimination of angularly displaced targets. Good angular resolution is achieved in the more conventional pulse radar systems by the use of highly directive antennas. However, such antennas have relatively narrow pass bands. Antennas that are broad band enough to propagate sub-nanosecond pulses also have an inherently broad beam width. Where it is desired to detect targets within about two meters of the detector, the inherent broad beam widths produced by base band antennas are not a particular problem because the outer boundary of the range gate and the natural fall off of the antenna response severely restrict the area covered at the short range. For some distances beyond this range, signal processng techniques have been successfully employed to narrow the effective beam widths. For example, one such technique has been described in the U.S. Pat. No. 3,858,205 to G. F. Ross for a "Base-Band Pre-collision Sensor with Time Domain Gating for Preventing False Responses", issued Dec. 31, 1974 and assigned to Sperry Rand Corporation. However, such techniques become increasingly ineffective as the range to the target is greatly increased with respect to the separation of the transmitter and receiver antennas.

Generally speaking, it is difficult to obtain a system that exhibits both a narrow effective beam width and negligible signal dispersion (i.e., has a wide band width). In antenna array systems, for example, one can obtain a narrow beam by employing a multiplicity of elements and by making the aperture dimensions large compared to the center wave length. However, to obtain simultaneously a wide band width, it is necessary to employ real time delays in the element feed network rather than instantaneous phase shift behind each element to afford coherent addition at the appropriate sum port.

A further solution of the problem is set forth in the G. F. Ross U.S. Pat. No. 4,017,854, issued Apr. 12, 1977 for "Apparatus for Angular Measurement and Beam Forming With Baseband Radar Systems", assigned to Sperry Rand Corporation. In this latter system, there is described an electromagnetic energy pulse system for transmitting very short base band pulses and for the reception of such pulses by dual base band receivers, the receiving antennas being separated by a distance much less than the range to the target to be detected. The base band receivers amplify the received signals, the amplified signals being further processed by being fed to opposite ends of a tapped transmission line, whereupon the angle to the target may be determined by the tap at which the two pulses arrive in coincidence. The taps are spaced along the transmission line, whereupon the angle to the target may be determined by the tap at which the two pulses arrive in coincidence. The taps are spaced along the transmission line by distances somewhat greater than one-half the product of the signal velocity on the transmission line and the duration of the received and reconstituted pulses, thus providing a means by which the relative time delays between the two receiving antennas may be determined to within one half the pulse width and concomitantly establishing an effective radiant beam width for the system proportional to the ratio of the pulse duration to the distance separating the two receiver antennas. While representing a valuable improvement over the prior art, the system of U.S. Pat. No. 4,017,854 has certain difficulties that will be discussed in more detail hereinafter, especially when used for automatic braking in road vehicles. Such problems make the prior art devices generally unsuited for use, for example, for operating vehicular braking mechanisms with respect to roadway lane widths of about 2.0 meters at a 45 meter forward distance of the intruding object, since effective antenna pattern widths as narrow as 2.7 degrees are then needed. In such an example, symmetrically disposed receivers spaced by about 0.75 meters from the transmitter would be employed.

SUMMARY OF THE INVENTION

The present invention relates to electromagnetic base band pulse train transmitter and symmetrically disposed dual receiver antenna systems in which the cooperating receiver antennas are placed symmetrically about the transmitter antenna and cooperate with a single base band receiver. The configuration, as applied in the field of vehicle collision avoidance and braking systems, employs a tapped delay correlation device, the arrangement effectively improving the resolution of the interferometer device, narrowing the normally wide associated antenna patterns so as to span only a single predetermined forward traffic lane. System cost and correlation efficiency are enhanced by the use of the single channel receiver cooperating with the receiver antenna pair.

DESCRIPTION OF THE PREFERRED EMBODIMENTS

Figure 1:
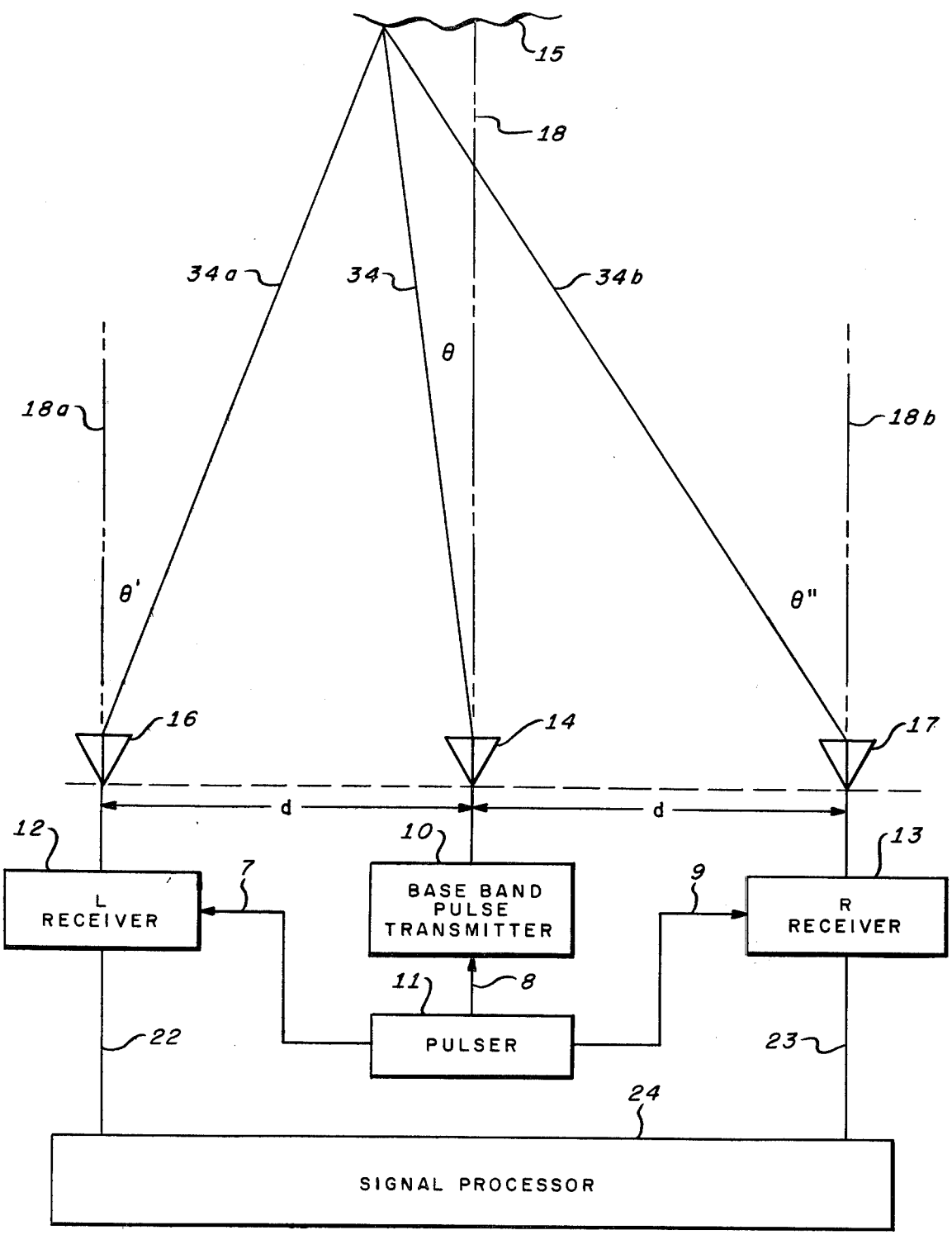
FIG. 1 is a block diagram of the prior art system, showing its components, their electrical connections, and the geometrical relationship of the target transmitter and receivers.

Referring to FIG. 1, the base band pulse transmitter 10 employed therein is actuated by a conventional current pulse generator 11 also normally supplying range gate synchronizing signals for the control of the base band pulse receivers 12 and 13. Transmitter 10 provides base band pulse signals for forward radiation by antenna 14. Signals reflected by the surface 15 of an object are collected by receiver antennas 16 and 17 for supply to receivers 12 and 13, respectively, receiver antennas 16 and 17 being symmetrically located on either side of transmitter antenna 14 and separated a distance d therefrom, the distance d being much shorter than the length of ray path 34 from antenna 14 to the reflecting surface 15. Ray path 34 is shown at an arbitrary angle $\theta$ from the perpendicular 18 to the base line 21, which latter passes through antennas 14, 16, and 17, while ray path 34a between receiving antenna 16 and surface 15 and ray path 34b between receiving antenna 17 and surface 15 form respective angles $\theta'$ and $\theta''$ with perpendiculars 18a and 18b. It will be understood that the geometry of FIG. 1 is distorted for the sake of clarity. Though not apparent in FIG. 1, ray paths 34, 34a, and 34b are normally much longer than d. Thus, the respective angles $\theta$ and $\theta''$ which ray paths 34a and 34b form with respect to perpendiculars 18a and 18b are approximately equal to $\theta$, making the three ray paths 34, 34a, and 34b nearly parallel.

Transmitter 10 and its associated antenna 14 may take any of several forms, descriptions of suitable combinations being given in U.S. Pat. No. 3,659,203, issued Apr. 25, 1972 to G. F. Ross and D. Lamensdorf for a "Balanced Radiator System" and in the U.S. Pat. No. 3,728,632 issued Apr. 17, 1973 to G. F. Ross for "Transmission and Reception System for Generating and Receiving Base-Band Duration Pulse Signals Without Distortion for Short Base Band Pulse Communication System".

Each of receivers 12 and 13 may be base band receivers of the general kind described in U.S. Pat. No. 3,662,316, issued May 9, 1972 to K. W. Robbins for "Short Base-Band Pulse Receiver" or in U.S. Pat. No. 3,728,632. All of the aforementioned patents are assigned to Sperry Rand Corporation. The two outputs of receivers 12, 13 on the respective leads 22, 23, which outputs may be reconstructed video pulses derived from the pulses received at receiver antennas 16 and 17, may be passed through respective manually or otherwise adjustable compensating delay devices found within signal processor 24 for purposes explained in the aforementioned U.S. Pat. No. 4,017,854 before processing in device 24 for correlation or other purposes. In the prior art device, the correlator 24 includes a transmission line with a number of equally spaced taps located thereon. One end of the transmission line is coupled to the output terminal of a first variable delay and the other end is coupled to the output terminal of a second variable delay, whereby the output pulses from the variable delays are coupled to the transmission line so that they propagate therein in opposite directions but toward each other. Connected at each tap of the transmission line is a coincident detector comprising a diode biased at a threshold voltage which may be coupled to a display or other utilization device.

Reconstituted video pulses coupled to the transmission line are of essentially equal duration and amplitude. When the pulses are simultaneously launched in the transmission line with a pulse width that is very much less than the transit time across the transmission line, the two pulses meet only in the vicinity of the midpoint of the line. At this central tap, a pulse will form with an amplitude equal to twice the amplitude of each of the input pulses and with a pulse duration equal to the pulse width of each of the launched pulses. As at 79 in FIG. 3, the prior art transmission line also possesses a center tap 0 and taps on either side thereof. Taps to the left of the center tap 0 are numbered with positive integers and those to the right with negative integers. If the output pulse at one end of the transmisson line is delayed relative to the input pulse at the other being launched on the transmission line, the double amplitude pulse will form at one of the positively numbered taps whereas, if the input pulse at one end of the transmission line is launched on the transmission line with a delay relative to the other input pulse, the double amplitude pulse will form at one of the negatively numbered taps. When the pulses coincide at a given tap, they are coupled to an associated detector circuit which provides an indication that the pulses received at antennas 16 and 17 have the time relationship represented by the given tap. To prevent conduction when the two pulses do not coincide, the detector is suitably back biased.

Figure 2:
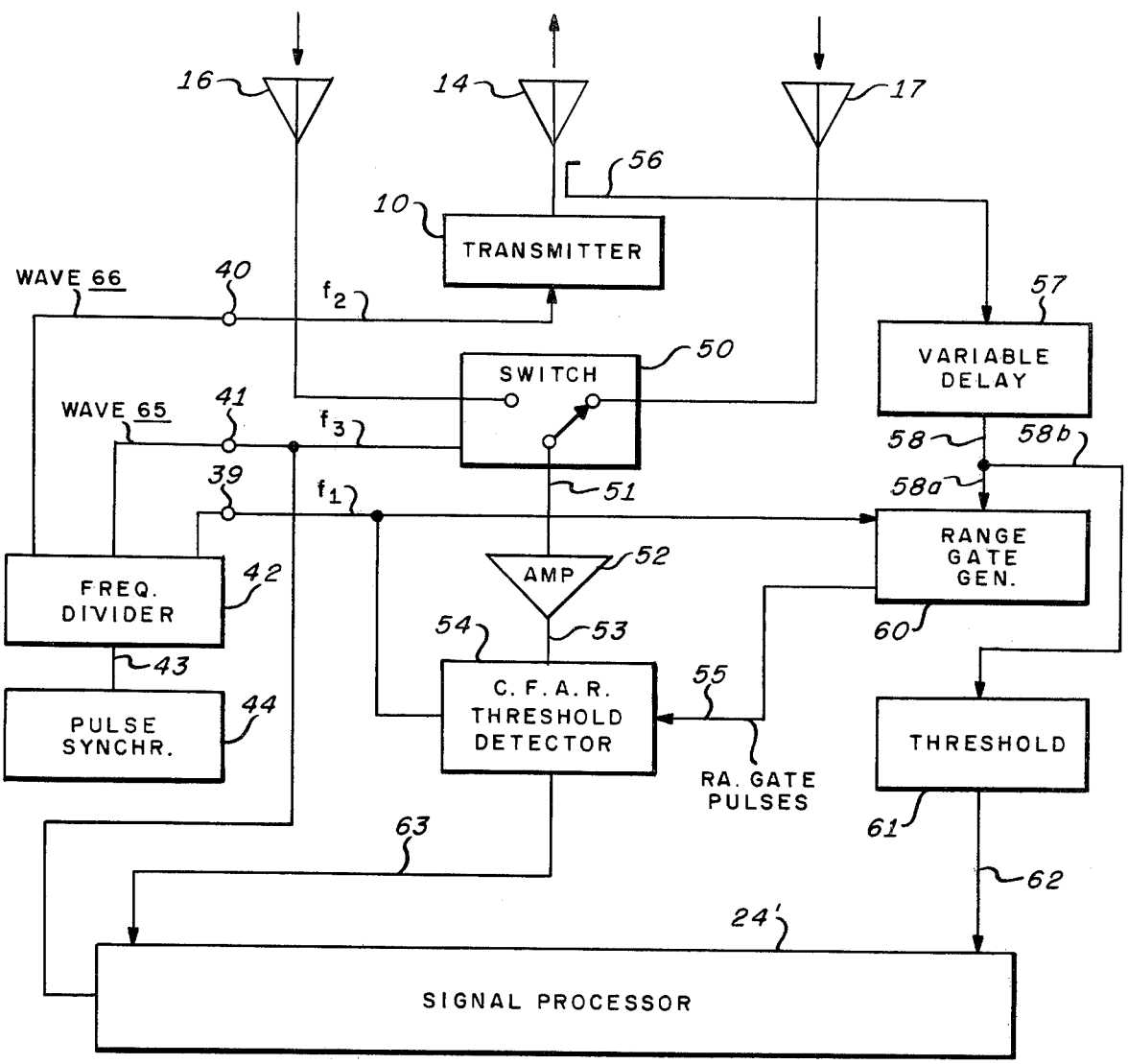
FIG. 2 is a block diagram showing a first feature of the present invention.

In the improvement of FIG. 2, the prior concept portrayed in FIG. 1 is modified to adapt it more adequately to perform the vehicle braking function. Elements common to the prior art system of FIG. 1 bear the same reference numerals in FIG. 2. In place of the two independent receivers 12 and 13 of FIG. 1, the configuration of FIG. 2 is modified to use only one receiver channel comprising the series connected switch 50, wide band amplifier 52, and constant false alarm rate threshold device 54. Switch 50 may be a conventional internally electrically actuated, rapid operating semiconductor device having a wide pass band with a minimum loss and delay. Threshold device 54 may be generally similar to arrangements disclosed by A. M. Nicolson and R. J. Brophy in the U.S. Pat. No. 3,755,696 for a "Detector Having A constant False Alarm Rate and Method for Providing Same", issued Aug. 28, 1973, or in the A. M. Nicolson and R. M. Mara U.S. Pat. No. 3,983,422 for a "Detector Having a Constant False Alarm Rate", issued Sept. 28, 1976, both patents being assigned to Sperry Rand Corporation. Such constant false alarm rate threshold circuits may consist of threshold detectors including a bistable device such as a tunnel diode with a first low-voltage stable state and a second high-voltage stable state and a variable threshold level sensitive to power supply fluctuations and to both noise signals and to useful input signals. Circuits for determining an active range gating interval for controlling the sensitivity of the bistable device are included, as well as counter circuits for separately indicating the presence of a target and for maintaining constant the false alarm rate in the detector circuit.

Figure 2A:
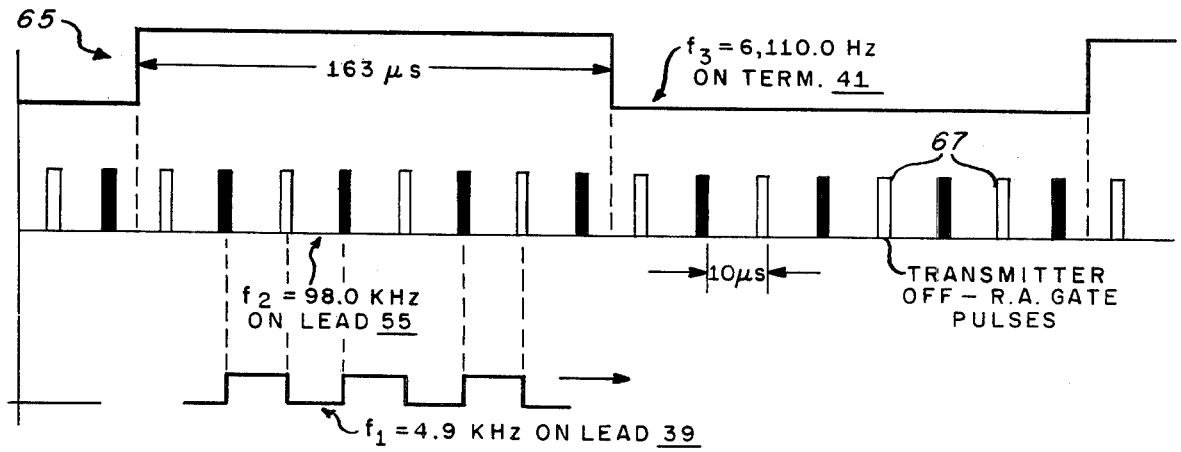
FIG. 2a provides wave form graphs useful in explaining the operation of the invention.

Transmitter 10 is synchronized by a pulse synchronizer 44 which may be crystal controlled and which also controls other features of the FIG. 2 system, as indicated in FIG. 2a by way of example. Pulse synchronizer 44 controls the timing of frequency divider 42 via electrical lead 43. The frequency divider or equivalent device 42 is arranged to generate at least three pulse trains $f_1$, $f_2$, $f_3$ found respectively on leads associated with junctions 39, 40, and 41. The $f_2$ pulse train shown as pulses 66 in FIG. 2a is used to excite transmitter 10 which, in turn, radiates a corresponding base band pulse train via antenna 14.

In order to assure that the novel signal processor system 24' is accurately synchronized with the actual pulses as they are emitted by antenna 14 toward the reflecting object surface 15, capacitively coupled versions of the emitted pulses are supplied via lead 56 to variable delay 57 for dual purposes. Variable delay device 57 may be a multiple turn potentiometer calibrated in increments of range delay. On the other hand, a conventional electronically shiftable delay device may be employed. The output of variable delay 57 is coupled via leads 58, 58a to a conventional range gate generator 60, such as the range gate generator of the general type, for example, disclosed in the Ross U.S. Pat. No. 3,750,025 for an "Energy Amplifying Selector Gate for Base-Band Signals", issued July 31, 1973 and assigned to Sperry Rand Corporation. Range gate generator 60 thus yields a gate positioned according to the setting of delay 57 supplied via lead 55 for the control of the constant false alarm rate threshold device 54. A second control signal supplied via terminal 39 to constant false alarm rate device 54 is the pulse train of frequency $f_1$ generated by divider 42. The range gate pulses on lead 55 are applied to C.F.A.R. threshold device 54; thus, there is a range gate for the reception of each target echo. The C.F.A.R. threshold device 54 automatically adjusts itself in a conventional fashion to its maximum sensitivity because a range gate is generated when the transmitter is off.

In this manner, signals from the threshold device 54 which represent only true echo responses received by antennas 16, 17 are supplied through a single receiver channel to the input 63 of signal processor 24′. These pulse train signals are therein correlated in a novel manner with respect to second pulse train signals from transmitter 10 appearing on lead 58b at the output of variable delay 57 and passing through the conventional threshold unit 61. It will be understood that the threshold levels of devices 54 and 61 are conveniently adjusted to pass only pulses of a sufficient amplitude that the signals on input leads 62 and 63 of signal processor 24′ respectively represent true received signals and true transmitted signals rather than spurious signals.

In the particular application of the invention to vehicular braking, unavoidable variations of the effective delays within the dual channel system of FIG. 1 are difficult to tolerate. The meaningful differential delays of paths 34a, 34b that it is desired to measure are defined in inches (corresponding to a duration of several hundred picoseconds). The use of dual channels can not be allowed in the particular application at hand, the possible maximum drift being about the same as the meaningful value to be measured, or even greater. The system of FIG. 2 removes the drift problem, switch 50 being used in a single receiver amplifier channel, a relatively less expensive arrangement than that of FIG. 1. The system of FIG. 2 is also readily adapted to use with the simple signal processor devices 24′ which will now be considered with respect to FIGS. 3 and 4.

Figure 3:
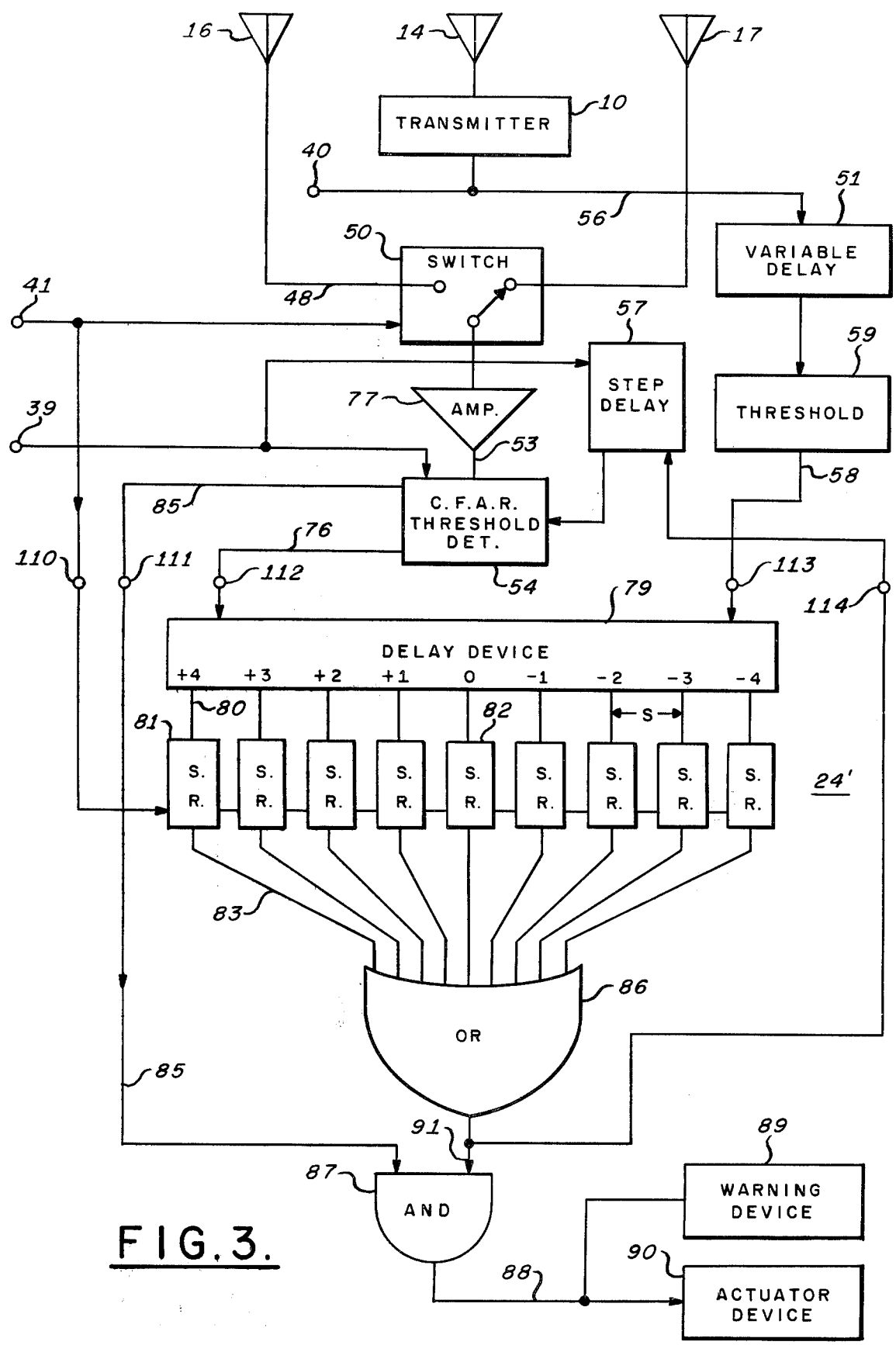
FIG. 3 is a block diagram showing a second feature of the present invention.

In the embodiment of FIG. 3, elements common to those of the FIG. 1 and 2 arrangements again bear similar reference numerals. It will also be assumed that transmitter 10 is again driven synchronously by the pulse signal train of frequency $f_2$ at junction 40 of FIG. 2, and that switch 50 and the constant false alarm rate device 54 are also controlled by the $f_3$ and $f_1$ pulse trains appearing in FIG. 2.

As in FIG. 2, the configuration of FIG. 3 uses a transmitter 10 with an associated radiating antenna 14, two receiver antennas 16, 17 spaced equally from radiating antenna 14, and a single receiver channel in which outputs from receiver antennas 16, 17 are successively switched by switch 50 into a single wide band amplifier 77. It will be understood that switch 50, though shown in the several figures for simplicity as a purely mechanical switch, will preferably be a semiconductor or other fast operating electrically driven switch operated as in FIG. 2a.

The novel signal processor 24′ found in the lower part of FIG. 2 is built around a conventional delay or delay line device 79 as will be discussed in further detail with respect to FIG. 3. It is to be understood with respect to FIG. 3 that the operation of switch 50 with respect to antennas 16, 17 and to the driver signals on terminal 41 is generally the same as in FIG. 2, as is the operation of base band pulse transmitter 10 with respect to the synchronizing pulse train placed on terminal 40.

When the video pulses flowing into delay device 79 at inputs 76 and 58 arrive simultaneously at the same tap of the array of taps including the tap +4, a corresponding double amplitude pulse is coupled out of that tap into one shift register such as register 81. For further example, if the incoming pulses arrive simultaneously at the ends of the uniform delay device 79, they will inherently arrive at the 0 tap simultaneously to yield a double amplitude pulse flowing into and operating the central shift register 82. This latter situation obtains when line 34 in FIG. 1 lies on top of the boresight line 18 and lines 34a, 34b are of equal length, angle $\theta'$ equals angle $\theta''$, and angle $\theta$ is zero. Simultaneous arrival of pulses at taps other than that feeding shift register 82 occur for finite positive or negative values of $\theta$.

In FIG. 3, the output of amplifier 77 is fed via lead 53 to a conventional constant false alarm rate threshold circuit 54 such as disclosed in the aforementioned patents and whose operation is additionally controlled by the $f_1$ pulse train appearing on junction 39 of FIG. 2. Device 54 yields a pulse representing a true target on output lead 85. Any output from delay device 79 which, as has been shown, results from the presence of true pulses representing an actually transmitted pulse and a true received echo pulse, is fed through one of the shift registers, 80, 82, et cetera, and ultimately arrives at OR gate 86.

The verified signals on the respective output leads 85 and 91 of device 54 and of OR gate 86 are supplied to AND gate 87. If both are present simultaneously in AND gate 87, a verified output reliably appears on lead 88 for use as desired. For example, the output signal may be used for control purposes by actuator 90 or by other utilization means. Alternatively or additionally, the signal lead 88 may be coupled to actuate a warning device 89, audible or visual, for alerting the vehicle operator.

In a typical arrangement of the FIG. 3 apparatus, four transmitter pulses are transmitted during the dwell of switch 50 on each of its input terminals, as seen in FIG. 2a. Accordingly, eight pulses are stored in a particular shift register while $\theta$ is constant. Thus, the registers 81, 82, et cetera, are eight-bit registers recycled every eight target hits, one each of which is completely filled on receipt of eight echo pulses. When $\theta$ stays constant, a useful output signal verifying the presence of a target is transmitted to OR gate 86. Its output on lead 91 inhibits steppable delay 57, thus causing the range gate to remain fixed. When twenty six out of thirty two consecutive bits are detected, for example, the C.F.A.R. conventional summation signal on lead 85 and the register signal 91 enable AND gate 87 and hence devices 89 and 90. If $\theta$ changes because of relative motion between the target direction 34 and the boresight line 18, pulses are stored in a corresponding shift register, the next reset pulse on terminal 41 from frequency divider 42 (FIG. 2) recycling the register array, also wiping out the data in those only partially filled.

In the FIG. 2 and 3 systems, the plurality of taps of delay device 79 readily renders the system useful for a variety of target ranges selectable by the vehicle operator. However, the less expensive system shown in part in FIG. 4 may be preferred where actuation is generally desired at a prescribed target range. This simplified system requires a delay device 79' having only one centrally located tap cooperating with a single central eight-bit shift register 82' regularly recycled by reset pulses applied by terminal 41. The output of the eight-bit register 82' is fed to AND gate 87 together with the conventional sum output at 85 of the constant false alarm rate device 54. Thus, when a target is within the range gate as defined by the setting of delay 57 (at 20 feet, for instance), and its echo is of sufficient intensity for more than twenty-six out of thirty-two consecutive transmissions, it produces an input on lead 85 to AND gate 87. An output from both device 54 and the eight-bit register 82' produces an alert signal in warning device 89 or an actuation of actuator 90 via AND gate 87. Inputs 110, 111, 112, 113, 114 correspond to the similarly numbered inputs of FIG. 3.

Figure 4:
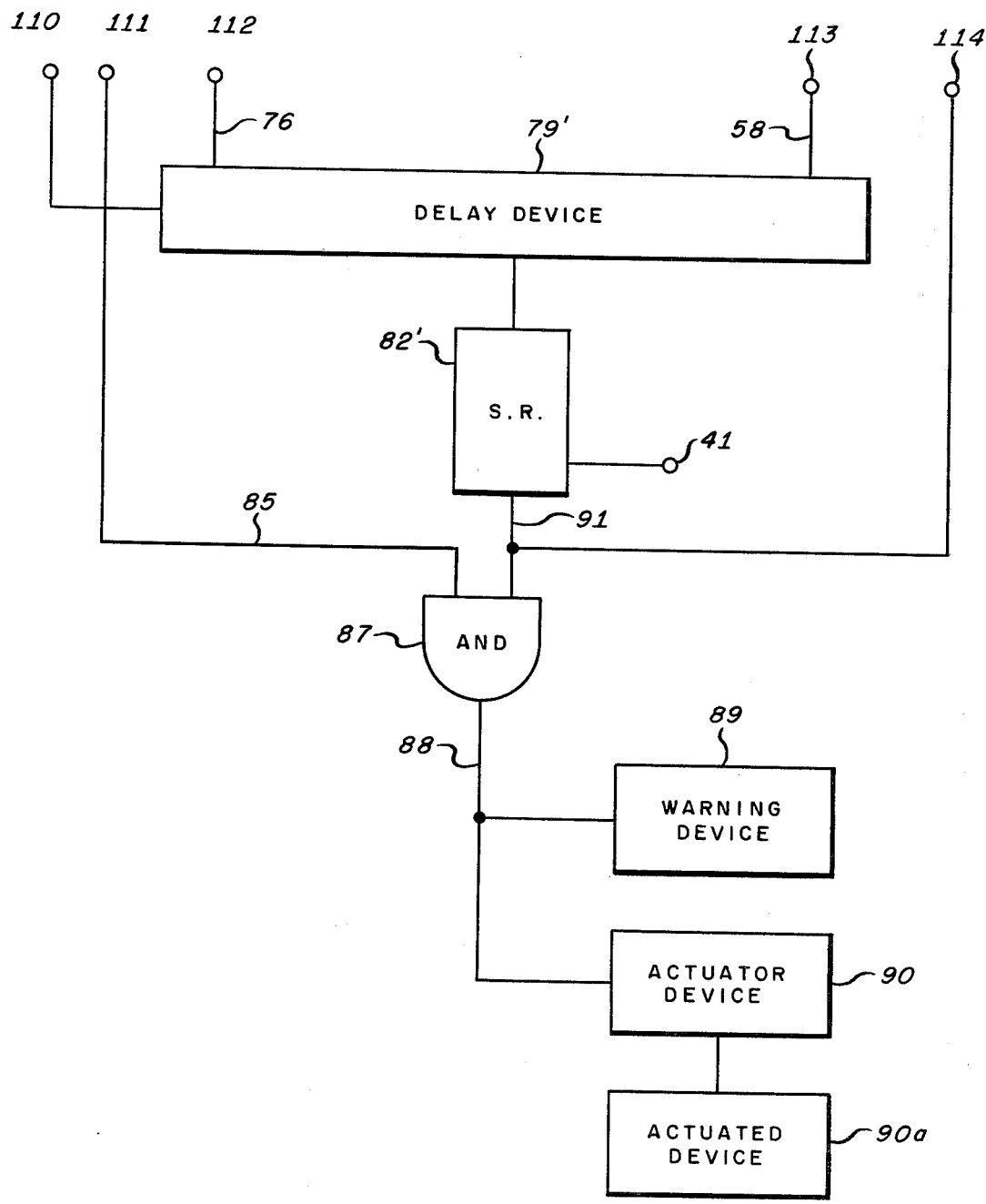
FIG. 4 is a block diagram of a system alternative to that of FIG. 3.
Figure 5:
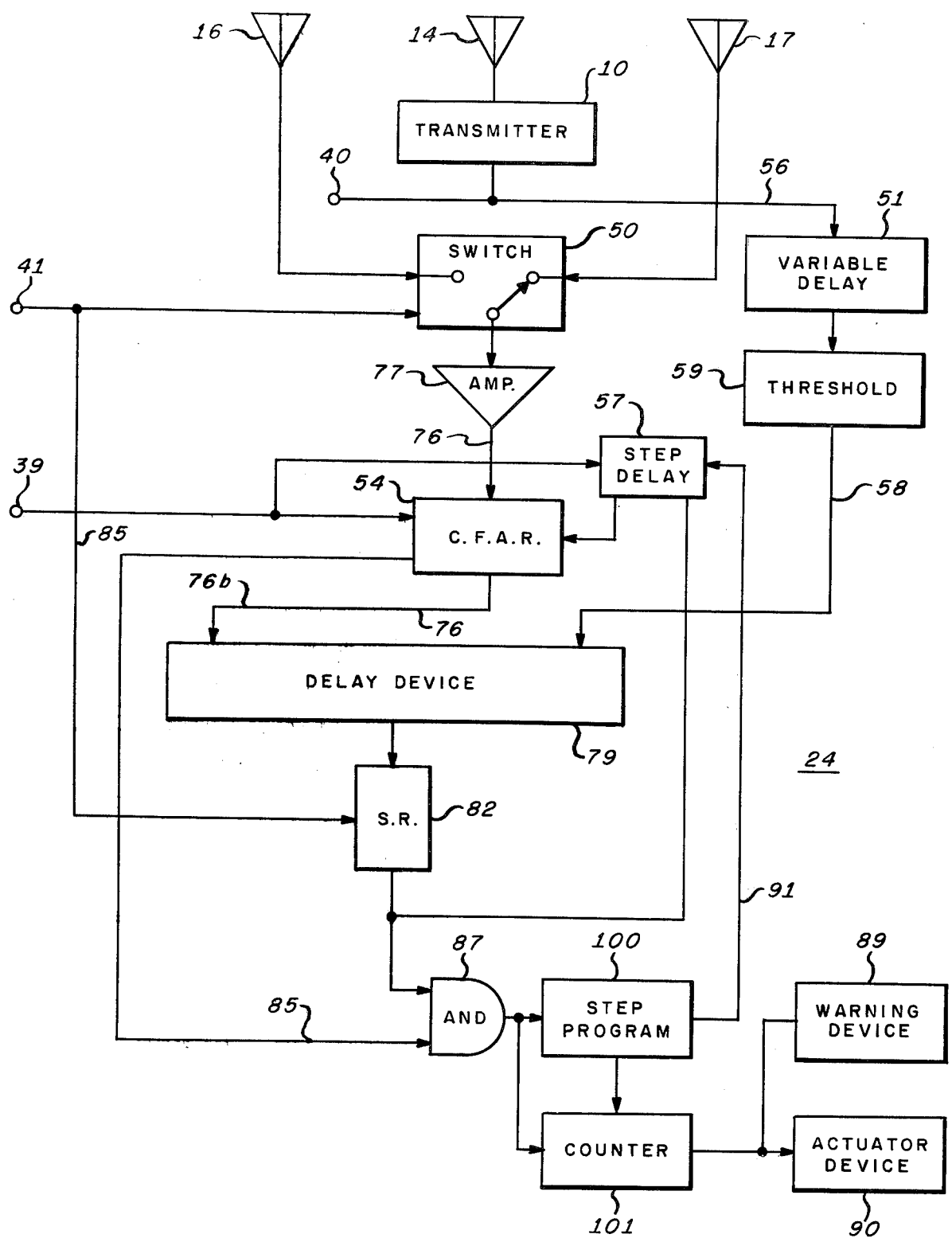
FIG. 5 is a block diagram of a variation of the embodiment of FIG. 4.

In the embodiment of FIG. 5, which is generally similar to that of FIG. 4 in that a single shift register 82 is used in the processor 24', elements common to preceding figures again bear similar reference numerals. The FIG. 5 system differs principally in the manner in which the output signals of the single shift register 82 are handled, the output of AND gate 87 being supplied to two additional elements, the step programmer 100 and counter 101. The AND gate 87 output, signalling a proper response to a real target, enables the conventional step program circuit 100 which, in turn, inhibits the control signal on lead 91. The step programmer circuit 100 now causes the conventional steppable delay 57 to reposition the range gate to a closer range and to hold the gate in its new position. If AND gate 87 once again signals a response to a real target, the step programmer 100 again moves the range gate incrementally to a lower range. This operation may be continued for as many interrogations as are pre-programmed by counter 101. For example, if the counter 101 is programmed for a predetermined number such as three, and three successful interrogations have been indicated as successive outputs of AND gate 87, the output of counter 101 then enables the warning and actuator devices 89, 90. Whenever there are fewer successful interrogations than the predetermined number, the step programmer circuit 100 reverts to normalcy and lead 91 is again enabled, counter 101 being reset at the same time.

With respect to FIGS. 1 through 5 and to the teachings of the G. F. Ross U.S. Pat. No. 4,017,854, an analysis appearing in the latter will be instructive. Assume in FIG. 1 that each of receiver antennas 16 and 17 has received a reflected pulse from an object surface 15, the object surface having been illuminated by a pulse radiated from the transmitter antenna 14. The reflecting surface 15 is located at the intersection of a first ellipse defined by the spacing between the receiver antenna 16 and the transmitter antenna 14, which are disposed at the foci of the ellipse, and the total path length from the transmitting antenna 14 to the object surface 15 and from the object surface 15 to the receiver antenna 16, a second ellipse being similarly defined by the receiver antenna 17 and the transmitter antenna 14. Since the separation d between transmitter antenna 14 and receiver antennas 16 and 17 is much less than the range to the reflecting surface 15, the ray path 34 which forms an angle $\theta$ with the perpendicular 18 from the transmitter antenna 14 to the reflecting surface 15 is nearly parallel to the ray paths 34a and 34b from the reflecting object to the receiver antennas 16 and 17, respectively, as previously discussed. The angles $\theta'$ and $\theta''$ in FIG. 1 that these ray paths make with the perpendiculars 18a and 18b are approximately equal to angle $\theta$. Thus, the path length difference P between the ray paths 34a and 34b, as determined by the perpendicular 35 from the receiving antenna 17 to the ray path 34a, is given by P=2d sin $\theta$, whereby the differential time delay T between reception at antenna 17 and reception at antenna 16 is P/c, where c is the signal velocity in free space. Assume that the tap spacing S, as shown in FIG. 3, is sufficient for the resolution of two pulses, i.e., is equal to one-half the distance that a signal with signal velocity v along transmission line 79, travels during the pulse width interval $\tau$. Assume also that ns is the distance from the center of the transmission line 79 to the tap at which the two pulses, launched from opposite ends of the transmission line 79, coincide. Where n is the tap number which can take on values of 0, +1, ±2 ... +N, it is apparent that:

$$\theta = \sin^{-1} c/v$$

or:

$$ns/d = \sin^{-1} nC\tau/2d$$

Thus, the tap at which the two pulses launched on transmission line 79 coalesce is determined by the angular location from the boresight 18 to the reflecting surface 15.

Again, as taught in the aforementioned U.S. Pat. No. 4,017,854, median intersecting ellipses may be drawn through a particular point target on surface 15, each of which may be bounded by ellipses that define the range resolution 2$\delta$ of the transmitter antenna 14-receiver antenna 16 and transmitter antenna 14-receiver antenna 17 combinations. These bounding ellipses define a resolution cell as explained in U.S. Pat. No. 4,017,854 with an angular resolution of:

$$\Delta\theta = 2 \sin^{-1} C\tau/4d \cos \theta$$

and a range resolution given by:

$$2\delta = C\tau/2$$

whereby, for small angles of the reflecting surface 15 with respect to boresight 18, angular resolution is approximately $$\Delta\theta = C\tau/2d$$

The angular region of detection may be limited by restricting the length of transmission line 79 or 79' or the number of taps thereon. Thus, transmission line 79 or 79' with a single centrally located tap as in FIG. 4 restricts the angular coverage to the resolution cell about boresight. Beam scanning to either side of the boresight direction may be accomplished with this arrangement by manually or otherwise adjusting variable delay 57 which previously has been adjusted only to compensate for differential time delays inherent in the receiver and antenna combinations. The angle through which the beam is scanned by this procedure is defind by:

$$\theta_s = \sin^{-1} C\tau/2d$$

where $\tau$ is the differential time delay inserted in delay 57.

While the invention has been described in its preferred embodiment, it is to be understood that the words which have been used are words of description rather than of limitation and that changes may be made within the purview of the appended claims without departing from the true scope and spirit of the invention in its broader aspects.

What is claimed is:

1. An apparatus employing reflection of base band electromagnetic pulses from an object to be detected for activating vehicular protective means in the nearby presence of said object comprising: transmitter means for radiating base band electromagnetic pulses to illuminate said object, first and second receiver means spaced apart and symmetrically disposed with respect to said transmitter means for receiving based band electromagnetic pulses reflected from said object,
   amplifier means,
   switch means for alternately coupling said first and second receiver means to said amplifier means,
   tapped delay means having first and second opposed input means respectively responsive to said amplifier means and to the radiation of each base band electromagnetic pulse by said transmitter means,
   at least one shift register means responsive to a predetermined tape of said tapped delay means intermediate said first and second opposed input means thereof,
   constant false alarm rate threshold means additionally responsive to said amplifier means,
   coincidence means responsive to simultaneous outputs of said constant false alarm rate threshold means and said one shift register means, and
   actuator means responsive to said coincidence means.

2. Apparatus as described in claim 1 further including adjustable delay means for delaying signals representing the radiation of each base band electromagnetic pulse by said transmitter means before application thereof to said second opposed input means.

3. Apparatus as described in claim 1 further including pulse synchronizer means for operating said transmitter means at a first rate and said switching means at a second rate, said first rate being a harmonic of said second rate.

4. Apparatus as described in claim 2 further including range gate generator means responsive to said adjustable delay means, said constant false alarm rate threshold means having a gain responsive to said range gate.

5. Apparatus as described in claim 4 further including threshold limiter means in series connection with said adjustable delay means and said second opposed input means.

6. Apparatus as described in claim 1 further including:

at least second shift register means responsive to a second tap of said tapped delay means,
   OR gate means responsive to said one and to said second shift register means,
   said coincidence means being additionally responsive to simultaneous outputs of said constant false alarm rate threshold means and of said second shift register means.

7. Apparatus as described in claim 1 wherein said tapped delay means includes a plurality of taps substantially equally spaced by an amount equal to one half the product of the signal propagation velocity in said tapped delay means and the duration of said base band electromagnetic pulses transmitted by said transmitter means.

8. Apparatus as described in claim 7 wherein said tapped delay means comprises transmission line means having one tap centrally disposed between said first and second opposed input means.

9. Apparatus as described in claim 1 wherein said actuator means comprises means for protective operation of the brakes of a vehicle.

10. Apparatus as described in claim 1 wherein said actuator means comprises means for warning the operator of a vehicle of the nearby presence of said object.

* * * * *